(No Model.)
E. C. ATKINS.
SAW TEMPERING AND STRAIGHTENING MACHINE.
No. 363,271. Patented May 17, 1887.
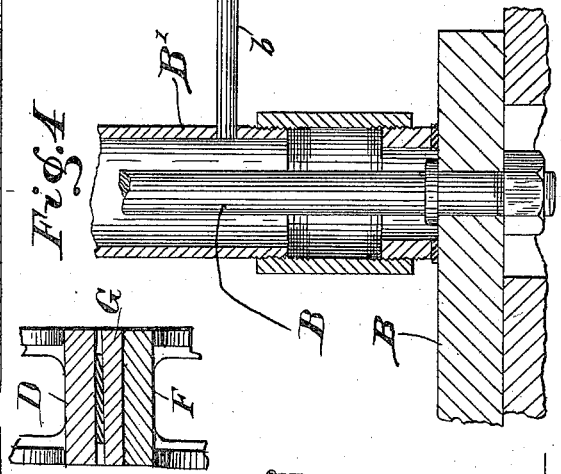
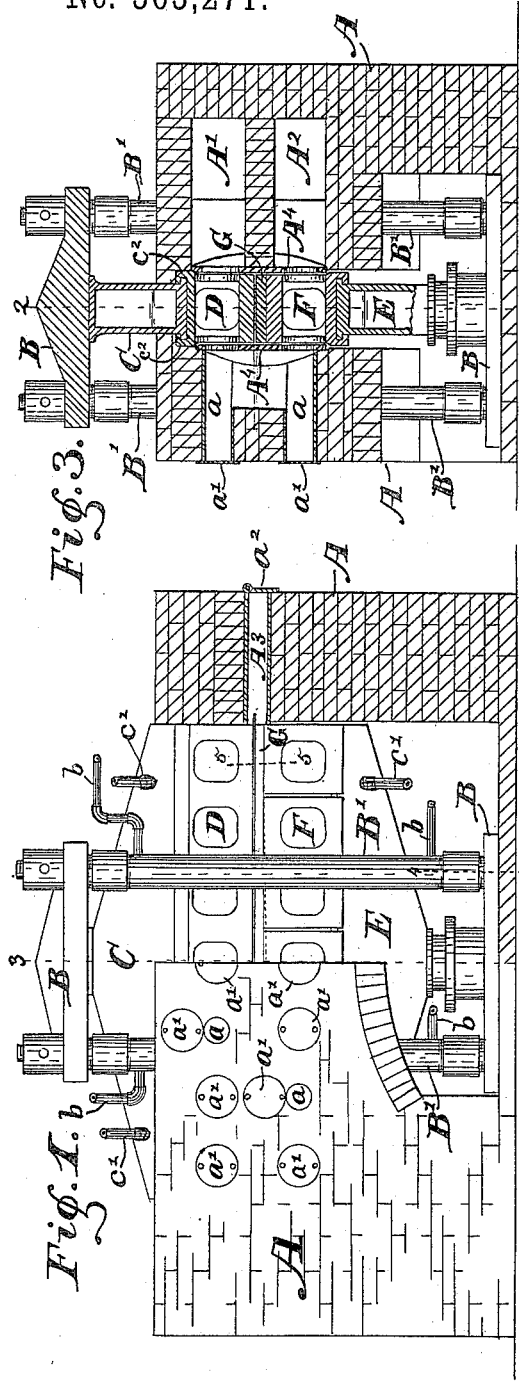
WITNESSES.
Chas. N. Leonard.
Charles B. Thurber.
INVENTOR.
Elias C. Atkins,
PER
C. Bradford,
ATTORNEY.

UNITED STATES PATENT OFFICE.

ELIAS C. ATKINS, OF INDIANAPOLIS, INDIANA.

SAW TEMPERING AND STRAIGHTENING MACHINE.

SPECIFICATION forming part of Letters Patent No. 363,271, dated May 17, 1887.

Application filed February 19, 1886. Serial No. 192,552. (No model.)

*To all whom it may concern:*

Be it known that I, ELIAS C. ATKINS, of the city of Indianapolis, county of Marion, and State of Indiana, have invented certain new and useful Improvements in Saw Tempering and Straightening Machines, of which the following is a specification.

My present invention consists in certain improvements upon that for which Letters Patent of the United States No. 250,184 were granted me under date of November 29, 1881.

The nature of these improvements will first be fully described in the specification, and then pointed out in the claims.

Referring to the accompanying drawings, which are made a part hereof, and on which similar letters of reference indicate similar parts, Figure 1 is a side elevation of a furnace embodying my invention, a portion being broken away to show the parts which come in contact with the saws; Fig. 2, a longitudinal vertical section on the dotted line 2 2 in Fig. 3; Fig. 3, a transverse vertical section on the dotted line 3 3 in Fig. 1; Fig. 4, a detail sectional view through a portion of one of the columns connecting the upper and lower portions of the press together, on the dotted line 4 4 in Fig. 1; and Fig. 5, a detail section on the dotted line 5 5 in Fig. 1, showing one form of the plate G more clearly.

In said drawings the portions marked A represent the masonry forming the outer portion of the furnace; B, the frame-work of the press; C, a "water-back" connected to the upper portion of said frame-work; D, the portion suspended from said water-back which comes in contact with the saws on the upper side; E, a water-back connected with the moving part of the press; F, blocks resting thereon, and G a plate resting on said blocks and forming a bed on which the saws rest while being treated.

The masonry A surrounds the apparatus which operates upon the saws, and has a fire-box, A', and a series of flues therein, the last of which, A$^2$, leads off and connects with the chimney or smoke-stack. Opposite the orifices through the operating parts of the saw tempering and straightening apparatus, above and below the saws, are openings $a$ in the sides of this masonry, which are provided with covers $a'$. These take the place of dampers, as by opening these covers $a'$ a reverse draft is created, which checks the passage of the products of combustion through the apertures in the saw-tempering apparatus at the particular point where these openings are located, and this serves the same purpose as shutting off the passage of such products of combustion through said apertures. By this means, when any portion of the apparatus acquires an excessive heat, the irregularity is corrected by simply opening these covers, and the temperature equalized. As shown in Fig. 1, an opening, A$^3$, is also provided in one end of this structure for the introduction of the saws, and this opening is provided with a cover, $a^2$. Set into the masonry and extending past the parts D, F, and G are side plates, A$^4$, which are arranged closely alongside said parts to prevent any flame from passing up or down alongside said sides. They are, however, provided with orifices similar to the orifices in the parts D and F, through which the products of combustion may pass, all as will be seen by reference to Fig. 3 of the drawings.

The frame B is for the most part constructed in a well-known manner, and consists of an upper and lower portion, (secured together by columns,) upon one portion of which the press or other operating power works. The columns, however, are different from those ordinarily employed in such presses, and by their peculiar construction the desirable result of bringing them in close to the apparatus which operates directly upon the saw is effected. The columns in themselves are the ordinary columns; but these, as shown in Fig. 4, are surrounded by tubes B', leaving a water-space between said tubes and the columns proper. These are fitted at the top and bottom with water-tight joints, as indicated, and are communicated with by pipes $b$. A continual flow of water being kept up through these hollow water-pipes, the columns are permitted to stand in the body of the furnace itself, subject to the flame and heat, and thus the press is materially reduced in size and expense, as it would be otherwise necessary to have the top and bottom portion much larger and correspondingly heavier, in order that the columns might pass outside of the masonry.

The water-back C is similar in form and construction to the one shown in my Letters Patent hereinbefore referred to, and is intended to receive a body of water, which is preferably kept flowing through it, by means of pipes $c'$, or a blast of cold air, which may be driven through it by a fan or by any other of the well-known means. This water-back is provided at its lower corners with flanges or grooves, (flanges $c^2$ are shown—see particularly Fig. 3,) and this forms a means of engagement with the part D, as will be presently described. It is also preferably provided with a series of small downward projections, $c$, upon its lower face, which come in contact with the upper face of the part D, and thus a free circulation is provided between the surfaces of this water-back and said part D. By this means this water-back is not so much affected by the heat of the part D as it would otherwise be, and this is a valuable auxiliary in enabling me to construct said part in one piece instead of in several sections, as has heretofore been done.

The part D (mainly for the reason above given) may be formed in a single piece, and as this permits an unbroken surface to come in contact with the saws being operated upon, it is preferable. This part is provided with a series of transverse apertures, through which the products of combustion from the furnace may pass, and also, preferably, has a longitudinal aperture throughout its entire length. The apertures are connected directly with the flues, and this part (as are also the blocks F) is heated by direct heat, which I have found superior to heating by radiation, as described in my former patent. Its top and bottom are planed perfectly true, as are also the faces of the projections $c$ on the water-back, and thus the saw when being treated is pressed out perfectly straight.

The water-back E is much like the water-back C, except that it is reversed in position and generally rests upon the moving part of the press, although, of course, the moving portion may come from above as well as below, if desired.

On the upper face of the water-back E rests a series of blocks, F, two sides of each of which are planed true on their faces, and thus form a perfect level with their upper surfaces, (except as hereinafter stated,) and are provided with the transverse and longitudinal apertures, through which the products of combustion may pass, similarly to the part D. They are preferably secured to the water-back E by the flange-and-groove arrangement the same as the part D is secured to the water-back C.

In order to compensate for the slight spring in the parts it is necessary that there should be a slight bow or arch in the apparatus—i. e., that the center should be hollowed out slightly—so that the parts may exert equal pressure when the spring is taken up by the operation of the press. (See dotted lines in Figs. 1 and 2.) I prefer to do this by arranging the set of blocks F on a planer in the position which they occupy in the furnace, the center ones slightly wedged up, and the thickness of the wedges decreasing until they are omitted altogether at the ends, and this gives the slight depression required in the center; but the same result can obviously be obtained by using wedges or thin strips under the blocks in the press, or by using similar wedges or strips between the part D and the water-back C, although I prefer to plane the blocks, as just described.

The plate G is a plain straight true plate of metal which rests upon the upper portions of the blocks F, and upon which the saws, in being treated, rest. By the employment of a single part D instead of a series of blocks and this plate G upon the lower blocks, I not only secure all the advantages of divided parts in the matter of obviating all danger of warping, but I secure a perfectly true, level, and continuous surface, upon which the saws rest while being operated upon.

When, as is often the case, it is desired to use this apparatus in treating saws which are thinner upon one edge than the other, (notably crosscut-saws,) this plate G is preferably planed to a bevel correspondingly, as illustrated in Fig. 5. Of course the part D or blocks F may be so planed to produce the same result, but this plate is the most convenient portion to handle. I therefore employ with each set of apparatus several of these plates, and with each kind of saws used the plate particularly fitted therefor.

The operation of my invention is as follows: The fire is of course built in the furnace A'. The products of combustion pass through the flues and the apertures in the part D, and thence down through the apertures in the part F to the flue $A^2$ and out. The draft is controlled by operating the covers $a'$ over the openings $a$ in the masonry, which, being arranged around on the sides of the masonry, are convenient of access and to operate, there being as many of these opening and covers as there are apertures in the part D and the blocks F, so that the passage of the products of combustion can be readily controlled at any point and from the outside of the furnace, and the temperature thus kept in an equal condition. A saw being introduced through the opening $A^3$, the press (a hydraulic press is shown) is operated, and the saw is pressed tightly between the upper surface of the plate G and the lower surface of the part D, and there held until heated to the required temperature to produce the desired result. When it has remained a sufficient time, the result will be found to be not only an equal and perfect temper throughout, but the saw-blade will be left true and straight, and much of the subsequent work usually required will be thus obviated. The water-backs, as indicated in my aforementioned Letters Patent, being kept comparatively cool, will not warp or spring, and thus the parts secured thereto or resting thereon will also be kept true, notwithstanding the tendency to warp inherent in such parts when subjected to intense heat.

I am aware that tempering-blocks for machines of the character herein described have heretofore been made of a series of hollow sections; that hammers and dies of various machines have been formed to give a desired shape to the article operated upon; that saws have been incased between plates before being submitted to the process of tempering, and that various parts of machines have heretofore been surrounded by water-jackets; but I am not aware that tempering-blocks have ever been provided with a separate supplemental face covering the joints between the sections of which it is composed, or that a tempering-machine has ever been constructed with the two parts of its press connected and secured together by columns passing close to the furnace and protected by water-jackets, or that the particular construction and combination of parts, as herein described and set forth in the claims, has heretofore been known.

Having thus fully described my said invention, what I claim as new, and desire to secure by Letters Patent, is—

1. The combination, in a saw tempering and straightening apparatus, of two water-backs, a hollow part secured to the upper water-back and extending through its entire length, numerous blocks, F, secured to the lower water-back, and a plate, G, resting on said blocks, thus affording a smooth unbroken face therefor, and means for operating the same.

2. The combination of the water-back C, having projections c on its lower face, and the tempering-blocks D, secured to and supported by said water-back, substantially as shown and described.

3. In a saw-tempering apparatus, the combination, with a tempering-block which is composed of several sections or series of blocks, of a supplemental face or plate, G, mounted on the top of said sections, whereby a smooth face is provided for said tempering-block, substantially as set forth.

4. The combination, in a saw-tempering apparatus, of a tempering-block composed of several sections and a plate or supplemental face covering said sections, said plate or face being planed somewhat at an angle, as specified, to fit saw-plates which are of different thicknesses at different portions, substantially as set forth.

5. In a saw-tempering apparatus, the combination of the parts which operate upon the saw, the furnace, and the press, the upper and lower parts of said press being secured together by columns which pass through said furnace near said operating parts and said columns, and water-jackets surrounding said columns, substantially as shown and described, and for the purposes specified.

6. The combination, in a saw-tempering apparatus, of the furnace, the parts which come in contact with and operate upon the saws, having numerous apertures for the passage of the products of combustion, and openings $a$, arranged in the masonry opposite to the several apertures and provided with covers, whereby the temperature may be equalized, substantially as shown and specified.

7. The combination, with the parts D and F, having apertures, as shown, of the openings $a$, having covers $a'$, substantially as shown and described, and for the purposes specified.

8. The combination, in a saw-tempering apparatus, with the parts which come in contact with the saws and which have openings through them for the products of combustion, of side plates covering the sides of said parts, but having corresponding orifices, substantially as shown and described.

9. The combination, in a saw tempering and straightening apparatus, of two surfaces operated by presses to come together upon the saw-plate, the surfaces which come in contact with the saw-plate being longitudinally arched or bowed somewhat in the center to compensate for the spring in the parts, substantially as set forth.

10. In a saw-tempering apparatus, the combination of upper and lower tempering-blocks which come in contact with the saw-plate, provided with apertures, as specified, and a furnace having flues connecting directly with said apertures, whereby the products of combustion from the furnace pass directly through said apertures and heat said parts by direct heat, substantially as shown and specified.

In witness whereof I have hereunto set my hand and seal, at Indianapolis, Indiana, this 15th day of February, A. D. 1886.

ELIAS C. ATKINS. [L. S.]

In presence of—
C. BRADFORD,
CHARLES L. THURBER.